(12) United States Patent
Rockenfeller et al.

(10) Patent No.: US 9,664,451 B2
(45) Date of Patent: May 30, 2017

(54) CO-FIRED ABSORPTION SYSTEM GENERATOR

(71) Applicant: Rocky Research, Boulder City, NV (US)

(72) Inventors: Uwe Rockenfeller, Boulder City, NV (US); Paul Sarkisian, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 895 days.

(21) Appl. No.: 13/784,624

(22) Filed: Mar. 4, 2013

(65) Prior Publication Data

US 2014/0245768 A1    Sep. 4, 2014

(51) Int. Cl.
*F28D 7/10*    (2006.01)
*F25B 27/00*    (2006.01)
(Continued)

(52) U.S. Cl.
CPC ............. *F28D 7/103* (2013.01); *F22B 7/04* (2013.01); *F22B 7/10* (2013.01); *F22B 9/04* (2013.01); *F24H 1/26* (2013.01); *F24H 1/52* (2013.01); *F24H 4/00* (2013.01); *F25B 15/04* (2013.01); *F25B 27/007* (2013.01); *F25B 33/00* (2013.01); *F25B 49/043* (2013.01); *F28D 7/0033* (2013.01); *F28D 21/0003* (2013.01);
(Continued)

(58) Field of Classification Search
CPC ...... F22B 7/04; F22B 7/10; F22B 9/04; F28D 7/103
USPC .................................................. 165/140, 141
See application file for complete search history.

(56) References Cited

U.S. PATENT DOCUMENTS 813,918 A  *  2/1906  Smitz ..................... F28D 7/103
                                                     122/367.2
1,246,583 A  *  11/1917  Fulweiler ................ F28F 13/12
                                                     138/38
(Continued)

FOREIGN PATENT DOCUMENTS

DE       102 48 557       5/2004
EP       2 204 627        7/2010

OTHER PUBLICATIONS

International Search Report and Written Opinion for International Application No. PCT/US2014/017077, Notification mailed Jun. 10, 2014.

(Continued)

*Primary Examiner* — Devon Russell
(74) *Attorney, Agent, or Firm* — Knobbe, Martens, Olson & Bear LLP

(57) ABSTRACT

A co-fired generator for use in a continuous-cycle absorption heating and cooling system may provide heat to the interior of an annulus chamber from a first heat exchanger, such as a firetube heat exchanger, supplemented by heat to the exterior of the annulus chamber from a second heat exchanger containing fluid heated by an external source. Some embodiments may circulate fluid heated in a solar-heated collector through the second heat exchanger. Other embodiments may route exhaust gas from a combustion engine through the second heat exchanger. The second heat exchanger may be provided with a plurality of fins to increase the surface area available for thermal transfer between the heated fluid and the annulus chamber.

26 Claims, 7 Drawing Sheets

(51) Int. Cl.

| | | |
|---|---|---|
| F22B 7/10 | (2006.01) | |
| F22B 7/04 | (2006.01) | |
| F22B 9/04 | (2006.01) | |
| F28D 7/00 | (2006.01) | |
| F28D 21/00 | (2006.01) | |
| F28F 1/12 | (2006.01) | |
| F28F 1/36 | (2006.01) | |
| F25B 15/04 | (2006.01) | |
| F25B 33/00 | (2006.01) | |
| F25B 49/04 | (2006.01) | |
| F24H 1/26 | (2006.01) | |
| F24H 1/52 | (2006.01) | |
| F24H 4/00 | (2006.01) | |
| F25B 27/02 | (2006.01) | |
| F28D 7/02 | (2006.01) | |

(52) U.S. Cl.
CPC .............. *F28F 1/126* (2013.01); *F28F 1/36* (2013.01); *F25B 27/02* (2013.01); *F25B 2315/002* (2013.01); *F28D 7/026* (2013.01); *F28D 2021/0024* (2013.01); *F28D 2021/0068* (2013.01); *Y02B 30/12* (2013.01); *Y02B 30/62* (2013.01)

(56) References Cited

U.S. PATENT DOCUMENTS

| | | | | | |
|---|---|---|---|---|---|
| 2,220,726 | A | * | 11/1940 | Newcum | F25B 40/00 165/179 |
| 2,316,273 | A | * | 4/1943 | Meyer | B64D 13/08 165/141 |
| 2,396,235 | A | * | 3/1946 | Arvins | F23K 5/20 165/141 |
| 2,578,550 | A | * | 12/1951 | Holm | F28D 7/103 165/141 |
| 2,611,587 | A | * | 9/1952 | Boling | F25B 39/02 165/141 |
| 2,682,157 | A | * | 6/1954 | Boling | F25J 3/04151 165/141 |
| 2,703,701 | A | * | 3/1955 | Simpelaar | F28D 7/103 165/141 |
| 2,847,193 | A | * | 8/1958 | Carter | F28D 7/022 165/11.1 |
| 3,587,531 | A | * | 6/1971 | Magnuson | F22B 7/00 110/326 |
| 3,835,816 | A | * | 9/1974 | Ferrin | F22B 37/06 122/156 |
| 3,938,233 | A | * | 2/1976 | Cannon | B23P 15/26 138/111 |
| 4,009,751 | A | * | 3/1977 | Zelnik | B01D 3/30 165/140 |
| 4,096,616 | A | * | 6/1978 | Coffinberry | B21D 53/06 165/141 |
| 4,228,848 | A | * | 10/1980 | Wadkinson, Jr. | F28F 1/003 165/134.1 |
| 4,455,154 | A | * | 6/1984 | Blasiole | C10J 3/84 165/119 |
| 4,543,943 | A | * | 10/1985 | Gruber | F24H 1/26 122/18.1 |
| 4,589,374 | A | * | 5/1986 | Farina | F24H 1/26 122/18.31 |
| 4,747,447 | A | * | 5/1988 | Scanlan | F24H 1/121 165/104.14 |
| 4,971,025 | A | * | 11/1990 | Mariani | F24H 6/00 122/155.2 |
| 5,046,548 | A | * | 9/1991 | Tilly | B01F 5/061 165/140 |
| 5,048,597 | A | * | 9/1991 | Bond | B64G 1/401 165/141 |
| 5,228,505 | A | * | 7/1993 | Dempsey | B21D 53/027 165/140 |
| 5,360,057 | A | | 11/1994 | Rockenfeller et al. | |
| 5,384,101 | A | * | 1/1995 | Rockenfeller | B01D 53/34 422/211 |
| 5,497,824 | A | * | 3/1996 | Rouf | F28F 13/12 138/38 |
| 5,660,165 | A | * | 8/1997 | Lannes | F24D 17/0068 122/14.2 |
| RE35,890 | E | * | 9/1998 | So | F28F 1/105 165/109.1 |
| 5,913,289 | A | * | 6/1999 | Gerstmann | F22B 37/06 122/367.3 |
| 6,047,767 | A | * | 4/2000 | Bodhaine | F28D 7/0066 165/141 |
| 6,095,240 | A | * | 8/2000 | Hassanein | F28D 7/0066 165/140 |
| 6,273,183 | B1 | * | 8/2001 | So | F28F 13/12 165/109.1 |
| 6,345,666 | B1 | * | 2/2002 | Conrad | F02G 1/0435 165/141 |
| 6,354,248 | B1 | * | 3/2002 | Bourke | F24H 1/205 122/155.2 |
| 6,648,062 | B2 | * | 11/2003 | Fukazu | F28F 3/04 165/185 |
| 6,718,792 | B1 | * | 4/2004 | Sarkisian | F25B 30/04 62/324.2 |
| 6,957,629 | B1 | * | 10/2005 | Steinhafel | F24H 9/0026 122/155.2 |
| 7,191,824 | B2 | * | 3/2007 | Wu | F02B 29/0462 165/141 |
| 8,550,147 | B2 | * | 10/2013 | Lansinger | B60H 1/00271 165/141 |
| 8,904,771 | B2 | * | 12/2014 | Won | F01M 5/001 165/140 |
| 8,906,243 | B2 | * | 12/2014 | Forwald | C01B 33/037 210/512.1 |
| 8,925,620 | B2 | * | 1/2015 | Lansinger | B60H 1/00342 165/141 |
| 2002/0050342 | A1 | * | 5/2002 | Gerstmann | F22B 7/00 165/109.1 |
| 2004/0159116 | A1 | | 8/2004 | Yamazaki | |
| 2005/0150640 | A1 | * | 7/2005 | Nadig | F28F 1/36 165/141 |
| 2005/0155748 | A1 | * | 7/2005 | Seager | F28D 7/106 165/154 |
| 2010/0307729 | A1 | * | 12/2010 | Sarkisian | F22B 37/06 165/183 |

OTHER PUBLICATIONS

Extended Search Report issued Oct. 4, 2016 in application No. PCT/US2014/017077.

\* cited by examiner

CO-FIRED ABSORPTION SYSTEM GENERATOR

BACKGROUND

Firetubes are used to heat a fluid by allowing heat transfer from hot gases from a burner to pass through a sealed chamber which is immersed in a liquid. The heat of the gas is transferred through the walls of the firetube by thermal conduction, and then heating the liquid, usually to its boiling point so that it transitions into a gas.

One known type of firetube has a cylindrical chamber with fins secured to the interior surface of the cylinder to increase the internal surface area. The firetube is surrounded by fluid, which is heated through contact with the outer surface of the cylinder. Combustive products, such as from natural gas or propane, exiting a burner head, enter the firetube and a portion of the resultant hot gas is funneled to flow outside of the fins and a portion is funneled to flow between the fins. The hot gas heats the fins from both sides and also heats the cylinder. The fins, being in contact with the cylinder, transfer their heat to the cylinder, and the cylinder heats the fluid around the firetube. A core plug within the cylinder forces the hot gas to flow near to the fins for a higher heat transfer coefficient. This provides a large heat output in a relatively short, small diameter tube.

Firetubes can be employed in continuous-cycle absorption cooling systems for the purpose of vaporizing ammonia in a water-ammonia solution. Such ammonia-based cooling systems are commonly used for air conditioning and refrigeration. These systems typically contain a generator, a condenser, an evaporator, and an absorber, with firetubes being one type of generator system employed. The system is filled with ammonia and water, at sufficient pressure for ammonia to condense into a liquid at operating temperature.

In such systems, water-ammonia solution is heated by a firetube. This heating produces bubbles of ammonia gas and water vapor which are then passed through a rectifier. In the rectifier, condensate for generator reflux is produced while nearly pure ammonia vapor can pass to a condenser where it is cooled and condenses into liquid ammonia. From the condenser the liquid ammonia flows into a subcooler for heat recovery and then through an expansion device for reduction in pressure. From there, the two phase, but mostly liquid, and nearly pure ammonia enters an evaporator, where heat transfer from a chilled heat transfer fluid, such as water or a brine, causes the ammonia to evaporate. The evaporation of the ammonia causes the desired cooling or refrigeration. Next, ammonia gas mixture flows into the absorber, where it comes into contact with the weak water-ammonia solution which flows back to the subcooler and then into the absorber from the generator. In the absorber, the ammonia is absorbed out of the gas mixture into the weak water-ammonia solution, resulting in a strong water-ammonia solution that flows to the generator system, completing the cycle of operation.

SUMMARY

To allow a generator system to be co-fired or to add additional surface area for increased efficiency, the fluid-filled annulus which surrounds the firetube to be heated may be enclosed in an additional cylindrical heat exchanger that provides heating from the outside of the boiling system. The exterior surface of the firetube heats the annulus holding the fluid from the inside, while a second surrounding cylindrical heat exchanger heats the annulus from the outside. This dual sided heating of the annulus augments the heat provided by the firetube and may increase heating efficiency of the overall system. Also, this system allows two different heat sources to be used for heating the generator.

Embodiments of the outer heat exchanger described herein may comprise an elongated cylindrical shell having a fluid inlet end, a fluid outlet end, an annulus chamber having an interior wall and an exterior wall, a first fin assembly secured on the outer surface of the interior annulus wall. The first fin assembly may comprise a single or a plurality of circular rows of elongated corrugated fins, each fin having a bottom surface secured to the outer surface of the interior annulus wall with two generally flat, planar sides extending upwardly from the bottom fin surface. The fins in each row may be aligned substantially parallel along the axis of the cylindrical shell, and the fins of one or more rows of fins may be offset angularly from the fins of an adjacent row of fins.

In some embodiments, the flat, planar sides of the fins are substantially parallel and the fins in each row of fins, respectively, are substantially identical in fin height, length and width. In other embodiments, the dimensions of fins in at least two of the rows are different in width, and/or length. The second fin assembly comprises a plurality of elongated rod-shaped fins arranged substantially parallel along the axis of the cylindrical shell, each fin having a bottom surface secured to the outer surface of the shell with two generally flat, planar sides extending upwardly from the bottom fin surface. In other embodiments, these fins may be corrugated with either flat or rounded crests. In some embodiments, these fins may be U-shaped. These as well as other variations in designs and embodiments of the fins for the outer heat exchanger design will be described hereinafter.

DETAILED DESCRIPTION

Figure 1:
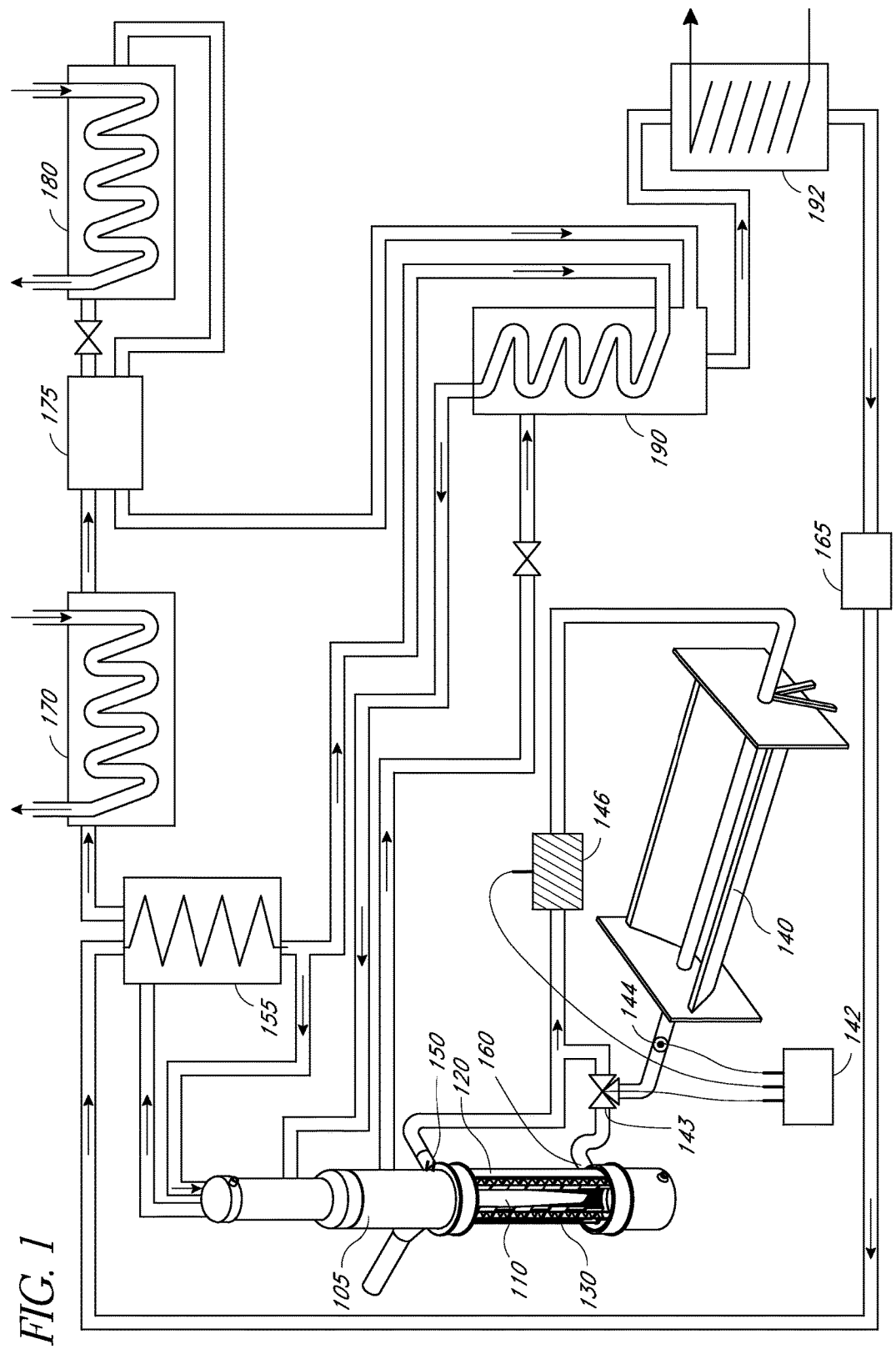
FIG. 1 is system overview of one embodiment of a continuous-cycle absorption cooling system employing a firetube generator augmented with a fluid heating source heat exchanger, here depicted as a solar collector.

One embodiment is a generator that includes a secondary or supplemental heat exchanger that can be configured to add heat to the generator fluid from the exterior. For example, the secondary heat exchanger may surround or jacket the generator fluid and contain a heat transfer medium. By linking the secondary heat exchanger to a heat source, such as a solar panel, engine exhaust or other heat source, the amount of energy input required by the fire tube is reduced. In this embodiment, the supplemental heat exchanger acts at the same time as the main or primary heater to increase the temperature of the generator fluid.

In one embodiment, the supplemental heat exchanger surrounds the generator and is configured to provide a thin layer of heat transfer liquid or gas against the outer wall of the generator. A set of fins can be disposed within the interior of the supplemental heat exchanger to more efficiently bring heat from the heat transfer medium to the interior of the generator. In operation, the heat transfer medium may be moved from a thermal energy source, such as a solar heater, to a lower inlet of the supplemental heat exchanger. This movement can be effected by a pump, blower, or pressure created by the head transfer medium. The heat transfer medium would then surround the exterior of the generator and move upwards and over a set of fins within the supplemental heat exchanger to an upper outlet. From the upper outlet, the heat transfer medium could circulate back to the thermal energy source, or for engine exhaust gas, exhausted to the ambient environment.

It should be understood that the movement the heat transfer medium in the supplemental heat exchanger can be controllable. Thus, in one embodiment, an electronically controllable valve or variable speed pump is used to ensure that the secondary heat exchanger adds heat to the generator and does not draw heat away from the generator. For example, a temperature probe can determine when the heat transfer medium from the thermal energy source has a higher temperature than the exterior of the fire tube. Under this circumstance, an electronically controlled pump may be engaged to pump the heat transfer medium into the supplemental heat exchanger in order to add heat to the generator. This control system thus allows the system to be tunable so that the proper amount of heat is added from the thermal energy source to the generator. In other embodiments, any type of fluid motive means, such as a blower, pumper or other implement for creating pressure on the heat transfer medium may be used for moving the heat transfer medium into the supplemental heat exchanger.

In still another embodiment, the supplemental heat exchanger can be used to remove heat from the generator by circulating heat transfer medium that is cooler than the fluid within the generator. This would allow the system to move heat from the generator to other devices external to the generator. For example, the system may be designed to heat certain adjacent spaces, devices, or systems by drawing heat away from the generator and circulating heat transfer medium to those target places.

FIG. 1 is a system overview of one embodiment of a continuous-cycle absorption cooling system 100 comprising a solar fluid heater 140, a temperature sensor 144, a controller 142, a pump 146, a rectifier 155, a condenser 170, a subcooler 175, a first and second absorber 190, 192, an evaporator 180, a solution pump 165, and a generator 105. The generator 105 includes an inner firetube 110. The inner firetube 110 is surrounded by an annulus chamber 130 filled with a fluid to be heated. In such continuous-cycle absorption cooling systems 100, energy is supplied to the firetube 110 to heat the fluid in the annulus chamber 130 to sufficient temperatures for the fluid to evaporate under the pressure of the system.

In addition to the inner firetube 110, the generator 105 also includes an outer heat exchanger 120 which is also configured to release heat into the annulus chamber 130. The heat exchanger operates by moving a fluidic heat transfer medium, for example heat transfer medium, from a fluid outlet manifold 150 and pumping it through pump 146 into a solar collector 140 to be heated by the sun. The heat transfer medium may then pass back to fluid inlet manifold 160 in the heat exchanger 120 that acts as a jacket surrounding the annulus chamber 130. When the temperature of the solar-heated heat transfer medium is higher than the temperature of the fluid in the annulus chamber 130, the solar-heated heat transfer medium may supplement the heating of the annulus chamber 130, reducing the amount of energy required to operate the firetube 110 to keep the annulus chamber 130 at the proper target temperature. When the temperature of the solar-heated heat transfer medium is not higher than the temperature of the fluid in the annulus chamber 130, for example at night or on a cloudy day, the flow of the heat transfer medium through the heat exchanger 120 may be stopped to avoid drawing heat out of the annulus chamber 130. One or more temperature sensors 144 can be used in association with the generator 105 to monitor its temperature and compare it to the temperature of the heat transfer medium. A controller 142 may be connected to the pump 146 and temperature sensor 144 to control flow of fluid through the system 100. The heat transfer medium may leave the solar powered heat exchanger 120 through the fluid outlet manifold 150 and return to the solar collector 140 to be heated by the sun. The heat transfer medium may be a glycol, such as propylene glycol or ethylene glycol. It may also be a heat transfer oil, paraffin, silicone, terpene, phenyl, cycloalkane or alkyl-based fluid or oil. In other embodiments, the heat transfer medium may be water as a single phase or two phases.

In addition, a bypass valve 143 may be disposed between the outlet of the solar collector 140 and the pump 146. The bypass valve 143 can be controlled by the controller 142 in order to circulate the heat transfer medium around and through the solar collector 140 until it reaches a pre-designated target temperature. Once the heat transfer medium has reached the pre-designated target temperature, the controller 142 can switch the bypass valve 143 so that the heat transfer medium then moves to the outer heat exchanger 120.

Figure 2:
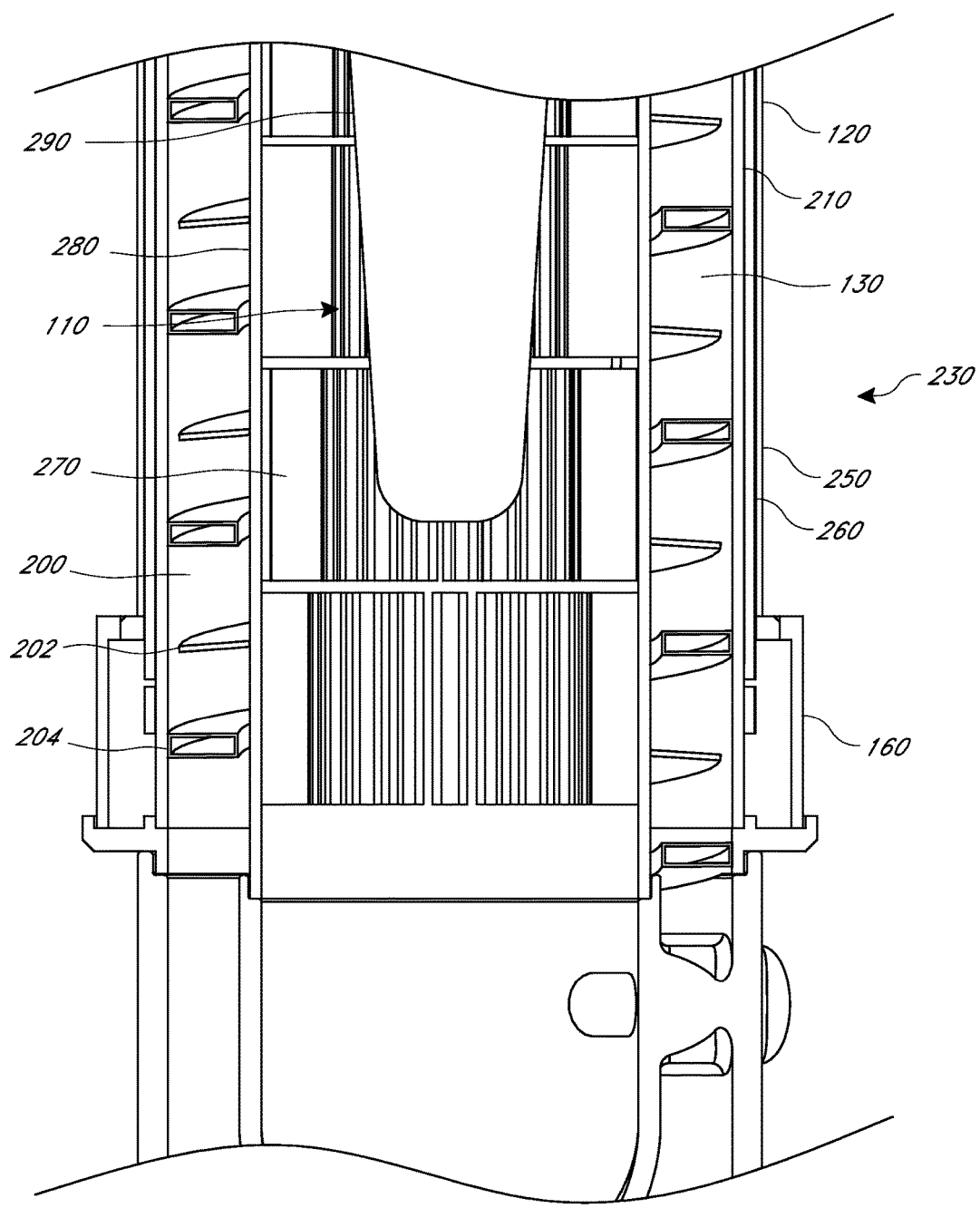
FIG. 2 is a vertical cross sectional view of one embodiment of a heat exchanger on the outside of a firetube generator system.
Figure 3:
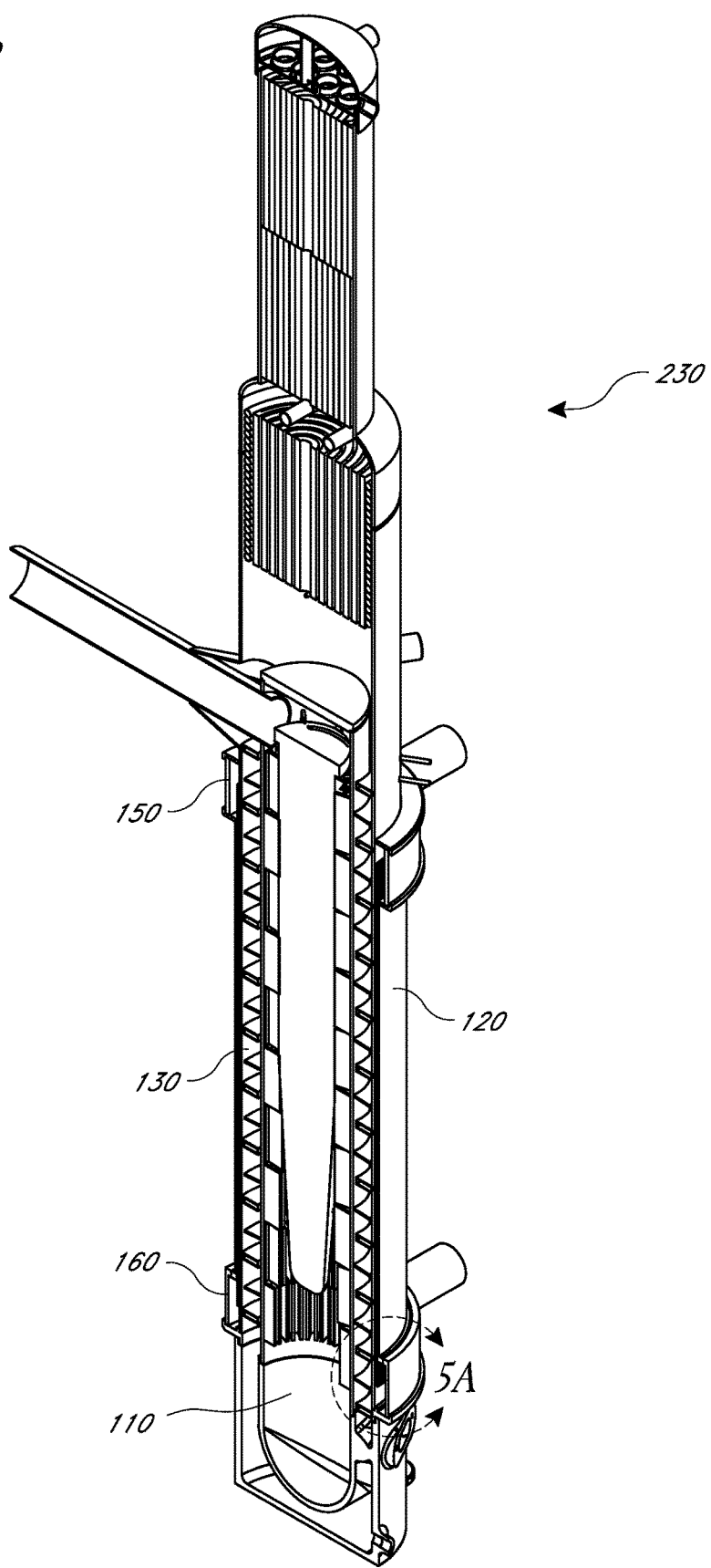
FIG. 3 is an isometric vertical cross sectional view of one embodiment of a heat exchanger on the outside of a firetube generator system.

FIGS. 2 and 3 illustrate a cross-sectional view of one embodiment of the generator 105 as shown in FIG. 1. As illustrated in FIG. 2, the generator 105 includes a firetube 110 which contains combustive products to generate heat. The firetube 110 has a cylindrical exterior shell 280 made of a thermally conductive material for heating the system 230 by means of heat transfer with the combustion products within the firetube 110. A plurality of fins 270 may be secured to the interior of the exterior shell 280 and arranged in circular rows. The fins 270 promote the transfer of heat from the combustion products within the firetube 110 through the exterior cylindrical shell 280 and into the medium to be heated. A core plug 290 forces the combustive products to pass through the fins 270 as the combustive products move through the firetube 110.

Surrounding the firetube 110 is an annulus chamber 130 jacketing the cylindrical exterior shell 280. The annulus chamber 130 contains a fluid (not shown) to be heated by the generator 105. Partition 202 and rectangular tubing 204 act to allow distillation to occur with heat recovery. Partition 202 and rectangular tubing 204 may be secured in an axially spiral configuration along the length of the cylindrical shell 280, creating channels 200 through which the annulus fluid may flow around the heated cylindrical exterior shell 280. The annulus chamber 130 further comprises an exterior wall 210 made of a thermally conductive material.

Heat exchanger 120 may surround the annulus chamber 130 through which fluid flows. The heat exchanger 120 contains a heat transfer medium (not shown) and is thus able to provide heat to the annulus chamber 130 independently of, or in addition to, the heat provided by the firetube 110. The heat exchanger 120 comprises a cylindrical outer shell 250, a fin assembly 260, a fluid inlet manifold 160 and fluid outlet manifold 150 for input and output of the heat transfer medium. The outer shell 250 may be metallic or composed of a thermally resistant material to reduce heat loss from the system. If metallic, insulation (not shown) can be used to reduce heat loss from the system. The fin assembly 260 is secured to the exterior annulus wall 210 and is composed of a thermally conductive material, such as steel, to allow for heat transfer with the annulus chamber 130. The heat transfer medium enters the heat exchanger 120 through the fluid inlet manifold 160 and travels along the exterior annulus wall 210 and through the fin assembly 260, exiting the heat exchanger through the fluid outlet manifold 150. The fin assembly 260 substantially increases the available surface area for transfer of heat from the heat transfer medium to the annulus chamber 130 over the bare exterior wall of the annulus.

In some embodiments, as the heat transfer medium enters the heat exchanger 120, it adds heat to the fluid within the annulus, and thereby reduces the amount of energy required to heat the annulus fluid to its target temperature. In other embodiments, heat exchanger 120 may be used to absorb heat from the fluid in the annulus.

Figure 4:
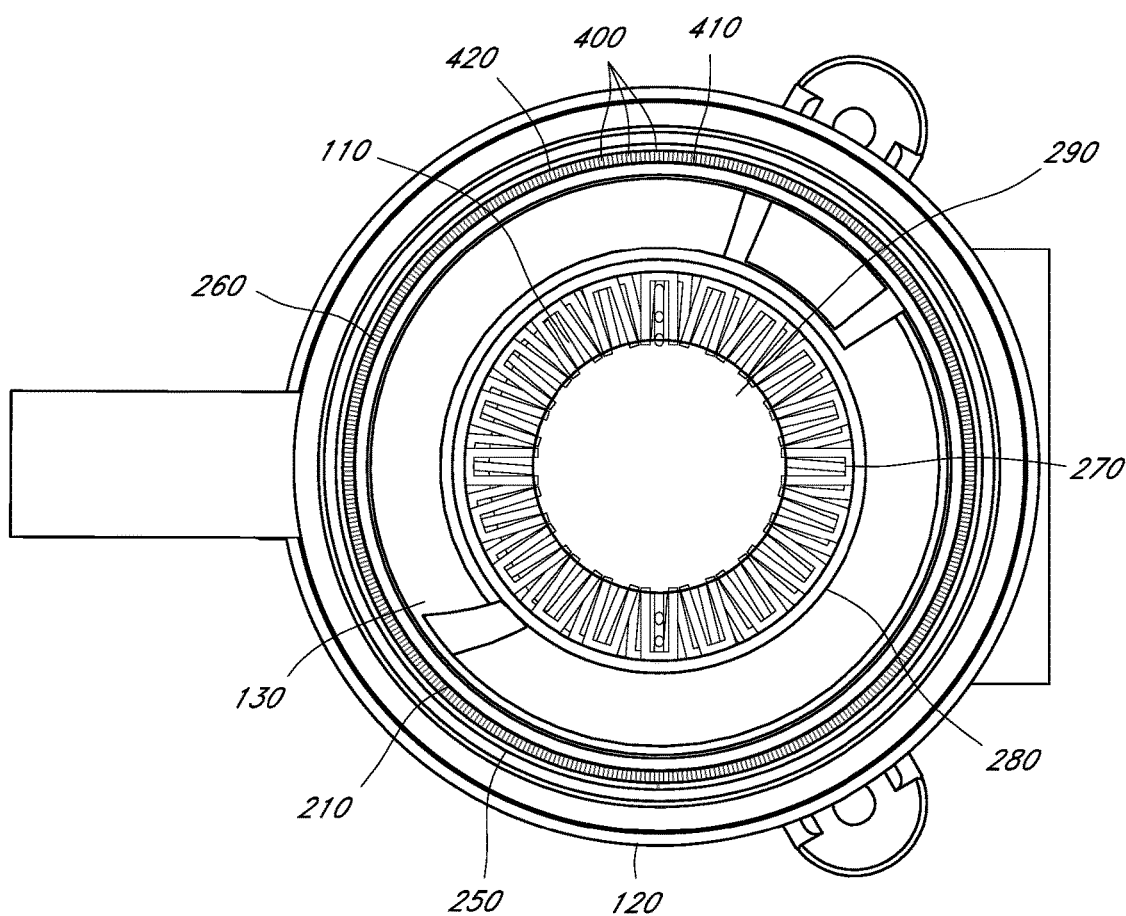
FIG. 4 is a horizontal cross sectional view of one embodiment of a heat exchanger on the outside of a firetube generator system.

FIG. 4 illustrates another cross-sectional view of one embodiment of the generator 105 as shown in FIG. 1. The core plug 290, firetube fins 270, exterior firetube shell 280, annulus chamber 130, exterior annulus wall 210, fin assembly 260, and cylindrical outer heat exchanger shell 250 are arranged in a concentric manner relative to one another. The fin assembly 260 of the heat exchanger 120 comprises a plurality of fins 400, which may comprise either individual fins or corrugated material, arranged circularly around the exterior annulus wall 210 and aligned substantially parallel along the axis of the cylindrical exterior annulus wall 210, each fin 400 having a bottom surface 410 secured to the exterior annulus wall 210 with two planar sides extending upward to the top surface 420. In certain embodiments, the top surface 420 may be secured to the outer heat exchanger shell 250. In some embodiments, the bottom surface 410 may be secured to the exterior annulus wall 210 by brazing with copper, nickel or other braze material.

The heat transfer medium enters the heat exchanger 120 through the fluid inlet manifold 160 and flows upward along the exterior annulus wall 210 between the fins 400 of the fin assembly 260, heating the fins 400 from all exposed sides and also heating the exterior annulus wall 210. The fins 400, being in contact with the exterior annulus wall 210, transfer heat to the exterior annulus wall 210, augmenting the heating of the annulus chamber 130 by the firetube 110, if firetube 110 is operating. The heat exchanger 120 can augment heat transfer to the fluid 130 or increase the efficiency of the generator 105 by providing additional surface area for heat transfer. In one embodiment of the heat exchanger 120, the heat transfer medium may be solar-heated liquid or liquid heated to sufficient temperature by other means. In another embodiment of the heat exchanger 120, the heat transfer medium may be exhaust gas, which may be routed into the fluid inlet manifold 160 from a source such as the exhaust of the firetube 110, from the exhaust of a generator, or from another device providing power to the system. It should be realized that the exhaust gas may come from a combustion engine, a gas turbine, or any other type of fuel combusting engine.

Figure 5A:
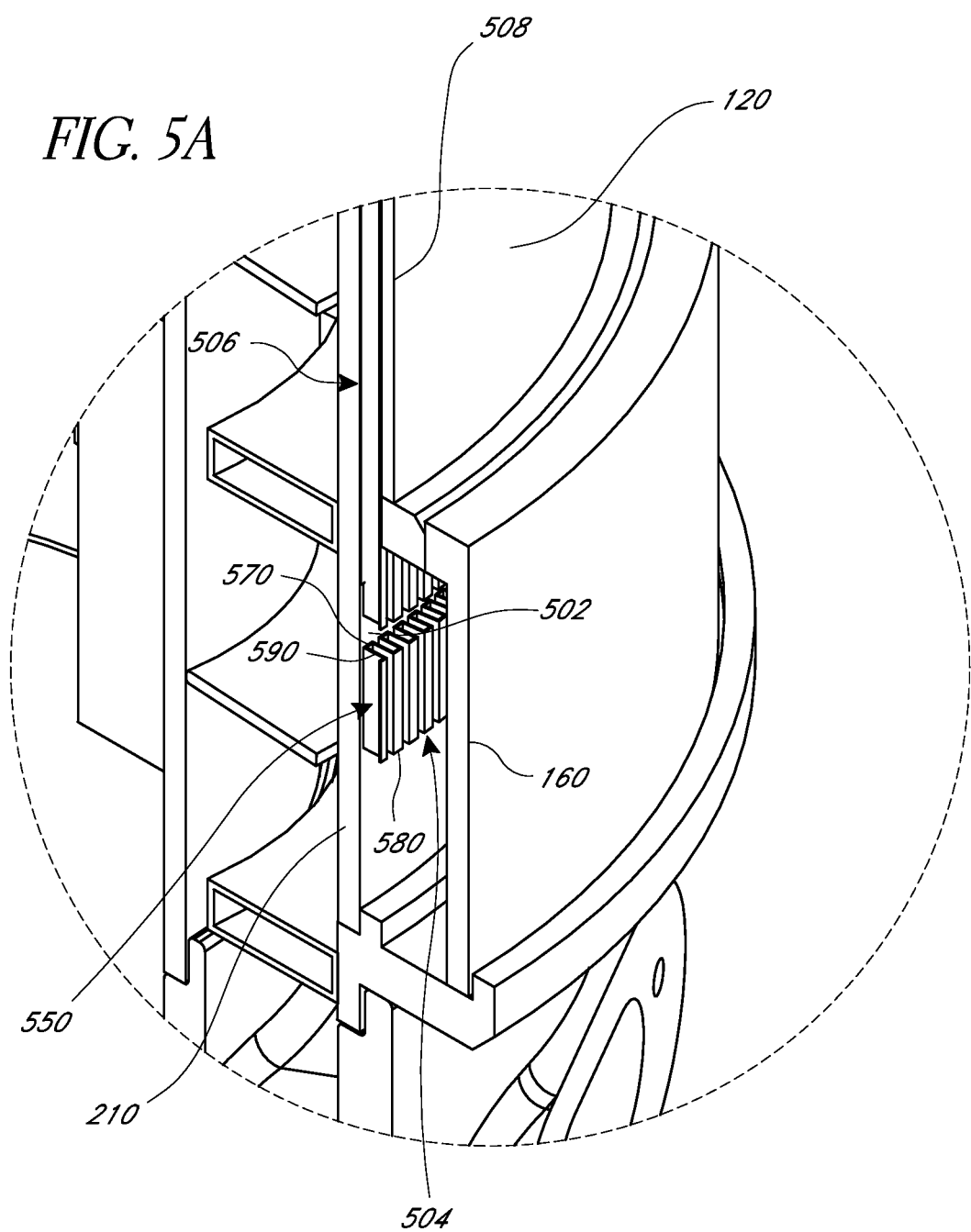
FIG. 5A illustrates one embodiment of the heat exchanger fin assembly employing flat crest corrugated fins.

FIG. 5A illustrates an embodiment of the fins of the heat exchanger 120 of the generator 105 as shown in FIG. 1 in which the fins 550 are corrugated in a series of substantially parallel crests 580 and furrows 570 connected by sides 590. The fin sides 590 are substantially parallel to one another and extend upwardly substantially perpendicular (normal) from the bottom surface. However, the sides 590 may be somewhat angled relative to one another due to the fin assembly curving around the cylindrical exterior annulus wall 210. The sides 590 may also be somewhat angled at obtuse or acute angles from the bottom surface. Such angles may be selected depending on the desired number of fins 550 as well as on the desired spacing of the fins 550. It will also be understood that the specific number of fins 550 will depend on the width of the fins 550 and the radial dimensions or circumference of the cylindrical exterior annulus wall 210.

The furrows 570 may be secured to the exterior annulus wall 210. The bottom surface of the furrows 570 may be generally flat, but may also be arched or curved preferably on a radius (radiused) to better match the radius or curvature of the cylindrical surface of the exterior annulus wall 210 underlying the furrow 570. In some embodiments the crests 580 may contact or be secured to the exterior heat exchanger wall 508, although in other embodiments the fins 550 may not contact the exterior heat exchanger wall 508.

Figure 5B:
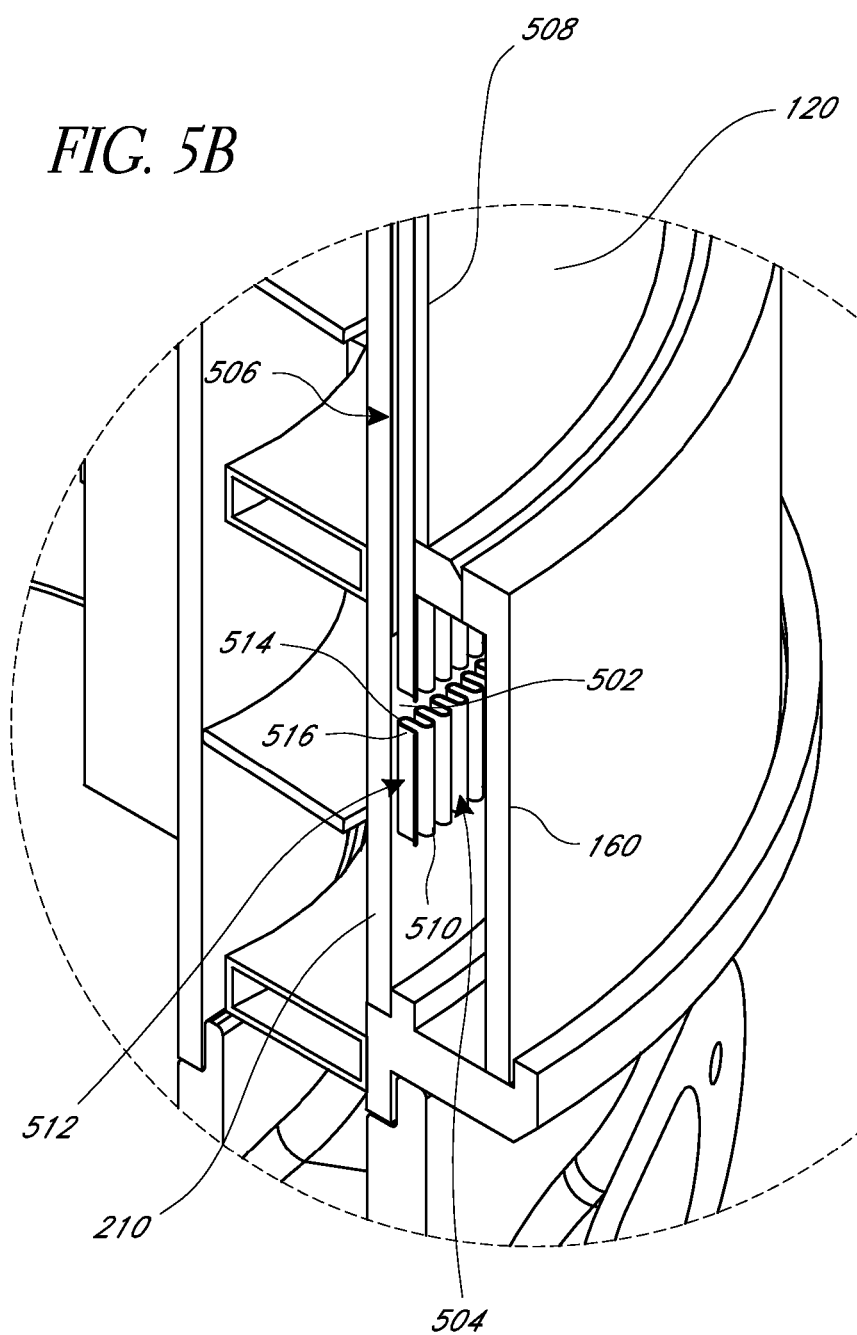
FIG. 5B illustrates another embodiment of the heat exchanger fin assembly employing rounded crest corrugated fins.

FIG. 5B illustrates another embodiment of the fins of the heat exchanger 120 of the generator system 230 as shown in FIG. 1 in which the fins 512 are comprised of a curved, corrugated sheet having a rounded crest with high point 510 which curves down to a low point 514. The intermediate portion 516 of the fins located between the high point 510 and the low point 514 may be angled, or the intermediate portions 516 may be substantially parallel to one another. The low point 514 may be secured to the exterior annulus wall 210. As illustrated, the radii of the high point 510 and low point 514 are substantially similar, however in some embodiments the radius of the high point may differ from the radius of the low point. Further, in certain embodiments the low point 514 may have a portion that is somewhat radiused to better match the curvature of the cylindrical surface of the exterior annulus wall 210 underlying the low point 514. In some embodiments the high point 510 may contact or be secured to the exterior heat exchanger wall 508, although in other embodiments the fins 512 may not contact the exterior heat exchanger wall 508.

Figure 5C:
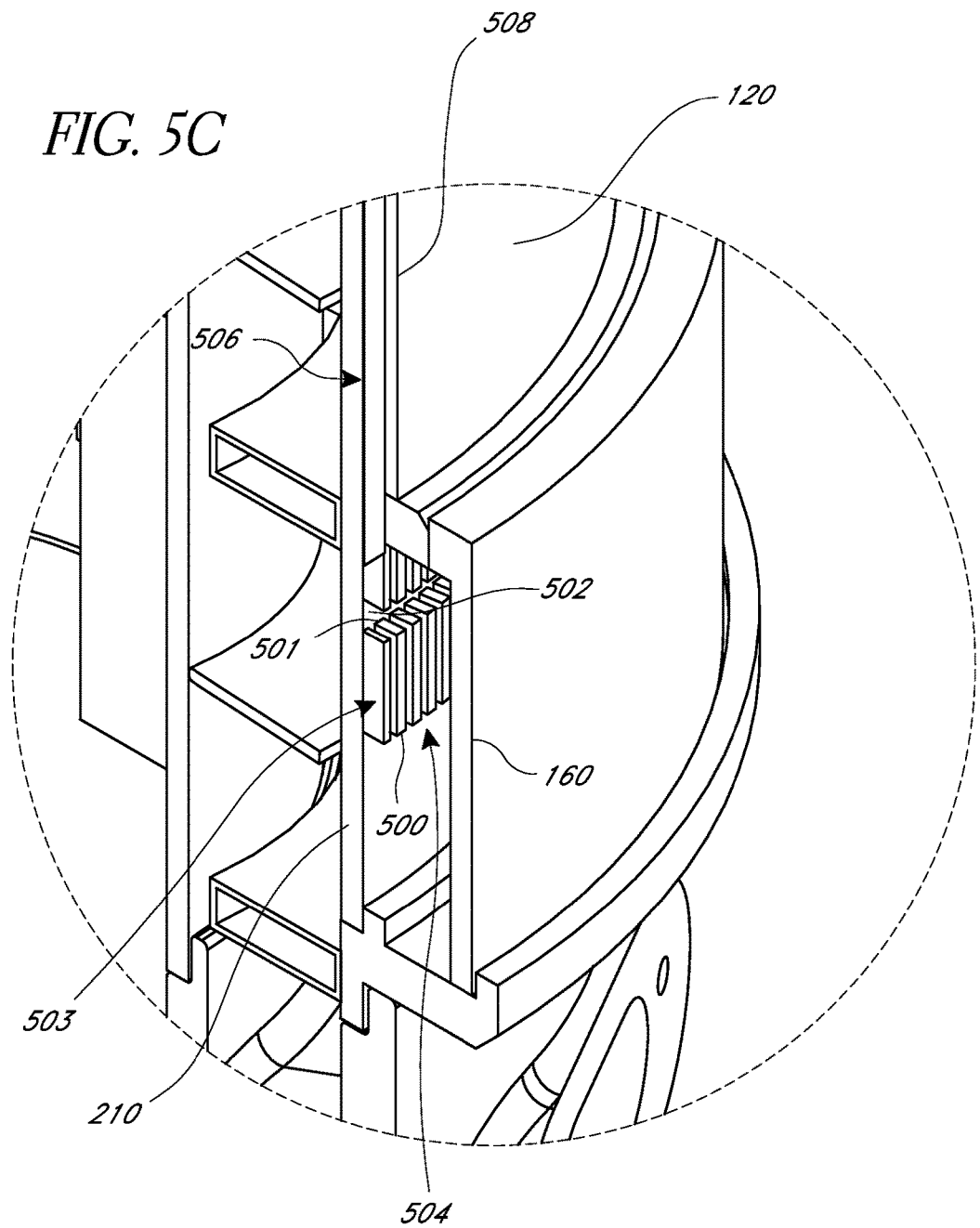
FIG. 5C illustrates another embodiment of the heat exchanger fin assembly employing flat rod type fins.

FIG. 5C illustrates yet another embodiment of the fins of the heat exchanger 120 of the generator 105 as shown in FIG. 1 in which the fins 503 comprise a circular row of flat rods secured around the exterior annulus wall 210. In this embodiment, the fins 503 are aligned lengthwise and substantially parallel along the axis of the cylindrical shell. The fins 503 have a lower surface 501 and an upper surface 500. The lower surface 501 may be secured to the exterior annulus wall 210. In some embodiments, the upper surface 500 may contact or be secured to the exterior heat exchanger wall 508, although in other embodiments the fins 503 may not contact the exterior heat exchanger wall 508. In one embodiment, the fins 503 may be rectangular rods, while in other embodiments the fins 500 may be rods of other shapes such as square rods or circular rods. The fins 500 may all be of the same width, or fins 500 of varying widths may be employed. The specific number of fins 500 employed in the fin assembly 260 will depend on the width of the fins 500 and the radial dimensions or circumference of the cylindrical exterior annulus wall 210.

As illustrated in FIGS. 5A, 5B, and 5C, the fin assembly comprises a plurality of fins arranged circularly around the exterior annulus wall 210 and aligned substantially parallel along the axis of the cylindrical exterior annulus wall 210. These fins may comprise a first row 504 located within the fluid outlet manifold 160, a gap 502, and a second row 506 extending partially into the fluid outlet manifold 160 and running the length of the exterior heat exchanger wall 508. The gap 502 promotes even flow of the fluid, and may be an actual gap between multiple rows, or may be a cut in a singular row. The first row 504 may be of a shorter length than the second row 506. The first row 504 and second row 506 may be comprised of fins of the same height, although it is possible that the fins of the first row 504 may be taller than those of the second row 506 due to their location within the fluid outlet manifold 160. Although not shown, in some embodiments the second row 506 may also extend partially into the fluid inlet manifold 150. In certain embodiments, there may be another gap and another row located within the fluid inlet manifold 150. This additional gap and row may be of the same dimensions as the gap 502 and first row 504, or may be of different dimensions than those features. Further, the additional gap and row are optional, and the second row may extend to the end of the fin assembly 260. In other possible embodiments, the gap 502 and first row 504 may be optional, and the fin assembly may only include the second row 506.

In other embodiments not illustrated the second row of the fin assembly may comprise a plurality of fins arranged in a plurality of circular rows around the exterior annulus wall. These rows may be separated by gaps of equal or varying dimensions, or the plurality of rows may abut one another. The length of the fins of all the rows may be the same, although different fin lengths in the different rows may be used. However, all of the fins in any single row may have substantially the same length. Similarly, the width of the fins in any row may be the same, although different fin widths may be used. However, in some embodiments, all of the fins in a row have substantially identical widths. In other embodiment, all of the fins in all of the rows of the fin assembly have substantially identical widths.

The fins in adjacent rows of fins may be aligned angularly along the length of the exterior annulus wall or fins of adjacent rows of fins may be offset angularly from one another. Of course, if the fins of adjacent rows of fins are of different widths, the upwardly extending sides of the fins in adjacent rows will present an offset of fin sides from inlet to outlet along the length of the exterior annulus wall. In one embodiment, with the fins being of substantially the same width, the fins may be aligned angularly without offset, or they may be offset angularly up to one-half of the fin width.

In other embodiments of the heat exchanger, the generator may be used to provide heat to the heat exchanger through the fluid in the annulus. For example, some or all of the heat from combustion products in the generator can be transferred throughout the fluid in the annulus to a fluid passing through the heat exchanger.

What is claimed is:

1. A continuous-cycle absorption heating and/or cooling system comprising:
   a closed circuit comprising a condenser, an absorber, and an evaporator;
   a co-fired generator comprising:
      a first heat exchanger;
      an annulus configured to contain a first fluid, the annulus having an interior surface and an exterior surface, the interior surface in thermal communication with the first heat exchanger and positioned to transfer heat to the annulus via the interior surface;
      a second heat exchanger in thermal communication with the exterior surface of the annulus and positioned to transfer heat to the annulus via the exterior surface;
      an inlet coupling the second heat exchanger to a heating device for providing a heated second fluid to the second heat exchanger in order to heat the first fluid from the exterior as the first heat exchanger heats the first fluid from the interior; and
      a controller configured to circulate the heated second fluid through the second heat exchanger when a temperature of the heated second fluid is above a temperature of the exterior surface of the annulus; and
   wherein the heating device is configured to heat the second fluid.

2. The system of claim 1, further comprising a fluid motive means configured to circulate the second fluid through the heating device and the second heat exchanger.

3. The system of claim 1, wherein the heating device comprises a solar collector.

4. The system of claim 1, wherein the second fluid is a heat transfer fluid.

5. The system of claim 4, wherein the heat transfer fluid is an oil, glycol, glycol/water mixture, paraffin, silicone, terpene, phenyl, cycloalkane, an alkyl-based heat transfer medium, or water as a single phase or in two phases.

6. The system of claim 1, wherein the second fluid comprises an exhaust gas.

7. The system of claim 6, wherein the exhaust gas comes from a combustion engine, a gas turbine, or any other type of fuel combusting engine.

8. The system of claim 1, further comprising a temperature sensor configured to determine the temperature of the second fluid before said fluid enters the second heat exchanger.

9. The system of claim 8, wherein the controller is configured to instruct a fluid motive means to bypass the second heat exchanger when the temperature of the second fluid is less than the temperature of the exterior surface of the annulus.

10. A co-fired generator comprising:
    a first heat exchanger;
    an annulus configured to contain a first fluid, the annulus having an interior surface and an exterior surface, the interior surface in thermal communication with the first heat exchanger and positioned to transfer heat to the annulus via the interior surface;
    a second heat exchanger in thermal communication with the exterior surface of the annulus and positioned to transfer heat to the annulus via the exterior surface;
    an inlet coupling the second heat exchanger to a heating device for providing a heated second fluid to the second heat exchanger in order to heat the first fluid from the exterior as the first heat exchanger heats the first fluid from the interior; and
    a controller configured to circulate the heated second fluid through the second heat exchanger when a temperature of the heated second fluid is above a temperature of the exterior surface of the annulus.

11. The generator of claim 10, wherein the first heat exchanger is a firetube heat exchanger.

12. The generator of claim 10, wherein the annulus comprises a partition and rectangular tubing, the partition and tubing being secured in an axially spiral configuration along the length of the annulus.

13. The generator of claim 10, wherein the second heat exchanger comprises a plurality of fins arranged circularly around the exterior surface and aligned substantially parallel along the axis of the exterior surface.

14. The generator of claim 13, wherein the fins are corrugated in a series of substantially parallel crests and furrows.

15. The generator of claim 13, wherein the fins are comprised of a curved, corrugated sheet having a rounded crest with a high point that curves down to a low point.

16. The generator of claim 13, wherein the fins comprise a circular row of flat rods secured around the exterior surface.

17. The generator of claim 13, wherein the fins comprise a plurality of circular rows.

18. The generator of claim 17, wherein the circular rows are separated by a gap.

19. The generator of claim 10, further comprising a fluid motive means configured to circulate the heated second fluid through the heating device and the second heat exchanger.

20. The generator of claim 10, wherein the heating device comprises a solar collector.

21. The generator of claim 10, wherein the heated second fluid is a heat transfer fluid.

22. The generator of claim 21, wherein the heat transfer fluid is an oil, glycol, glycol/water mixture, paraffin, silicone, terpene, phenyl, cycloalkane, an alkyl-based heat transfer medium, or water as a single phase or in two phases.

23. The generator of claim 10, wherein the heated second fluid comprises an exhaust gas.

24. The generator of claim 23, wherein the exhaust gas comes from a combustion engine, a gas turbine, or any other type of fuel combusting engine.

25. The generator of claim 10, further comprising a temperature sensor configured to determine the temperature of the second fluid before said fluid enters the second heat exchanger.

26. The generator of claim 10, wherein the controller is configured to instruct a fluid motive means to bypass the second heat exchanger when the temperature of the second fluid is less than the temperature of the exterior surface of the annulus.

* * * * *